(12) United States Patent
Kataoka et al.

(10) Patent No.: US 7,616,641 B2
(45) Date of Patent: *Nov. 10, 2009

(54) STS FRAME-ATM CELL CIRCUIT EMULATION APPARATUS AND FRAME LENGTH COMPENSATION METHOD FOR THE SAME

(75) Inventors: Souichi Kataoka, Tokyo (JP); Ken Shiraishi, Tokyo (JP)

(73) Assignee: Juniper Networks, Inc., Sunnyvale, CA (US)

( * ) Notice: Subject to any disclaimer, the term of this patent is extended or adjusted under 35 U.S.C. 154(b) by 876 days.

This patent is subject to a terminal disclaimer.

(21) Appl. No.: 11/240,626

(22) Filed: Oct. 3, 2005

(65) Prior Publication Data

US 2006/0077982 A1   Apr. 13, 2006

Related U.S. Application Data

(63) Continuation of application No. 09/866,616, filed on May 30, 2001, now Pat. No. 7,002,969.

(30) Foreign Application Priority Data

May 30, 2000   (JP)   .............................. 2000-159603

(51) Int. Cl.
*H04L 12/28*   (2006.01)
(52) U.S. Cl. .................................................. 370/395.1
(58) Field of Classification Search ........................ None
See application file for complete search history.

(56) References Cited

U.S. PATENT DOCUMENTS

| 5,206,858 A | 4/1993 | Nakano et al. ............... 370/465 |
| 5,541,926 A | 7/1996 | Saito et al. .................... 370/474 |
| 5,742,600 A | 4/1998 | Nishihara ................ 370/395.6 |
| 5,764,637 A | 6/1998 | Nishihara .................... 370/397 |
| 5,936,965 A | 8/1999 | Doshi et al. .................. 370/469 |
| 6,122,281 A * | 9/2000 | Donovan et al. ............ 370/401 |
| 6,167,062 A | 12/2000 | Hershey et al. ............. 370/503 |
| 6,810,039 B1 | 10/2004 | Parruck et al. ............ 370/395.5 |
| 7,002,969 B2 * | 2/2006 | Kataoka et al. ........... 370/395.6 |
| 2002/0093949 A1 | 7/2002 | Yasue et al. ................. 370/356 |

FOREIGN PATENT DOCUMENTS

WO   WO 01/20852 A1   3/2001

* cited by examiner

*Primary Examiner*—Anh-Vu H Ly
(74) *Attorney, Agent, or Firm*—Harrity & Harrity, LLP (57) ABSTRACT

A circuit simulation apparatus is disclosed by which, even if an STS-N frame of an abnormal length is detected by a reassembly buffer, the frame length can be compensated for while preventing an overflow of the reassembly buffer. When an STS-(N×M) frame formed by multiplexing M STS-N frames formed from different channels is cellularized into ATM cells or M different STS-N frames assembled from ATM cells are multiplexed into an STS-(N×M) frame, an ATM cell sync signal and ATM cell data from a buffer section are outputted as a frame pulse signal and frame data from a reassembly section to a circuit termination section, and frame length compensation of the frame pulse signal and the frame data is performed by the reassembly section.

13 Claims, 7 Drawing Sheets

STS FRAME-ATM CELL CIRCUIT EMULATION APPARATUS AND FRAME LENGTH COMPENSATION METHOD FOR THE SAME

RELATED APPLICATION

This application is a continuation of U.S. patent application Ser. No. 09/866,616 filed May 30, 2001, now U.S. Pat. No. 7,002,969 the disclosure of which is incorporated herein by reference.

BACKGROUND OF THE INVENTION

1. Field of the Invention

The present invention relates to a circuit emulation apparatus for cellularizing an STS (Synchronous Transmission Signal) frame of the STM (Synchronous Transmission Mode) into ATM (Asynchronous Transfer Mode) cells and multiplexing ATM cells into an STS frame, and more particularly to a circuit emulation apparatus and a frame length compensation method by which an AU pointer (Administrative Unit pointer) rewriting system for keeping the frame length fixed even if an abnormal STS frame length is detected.

2. Description of the Related Art

Figure 3:
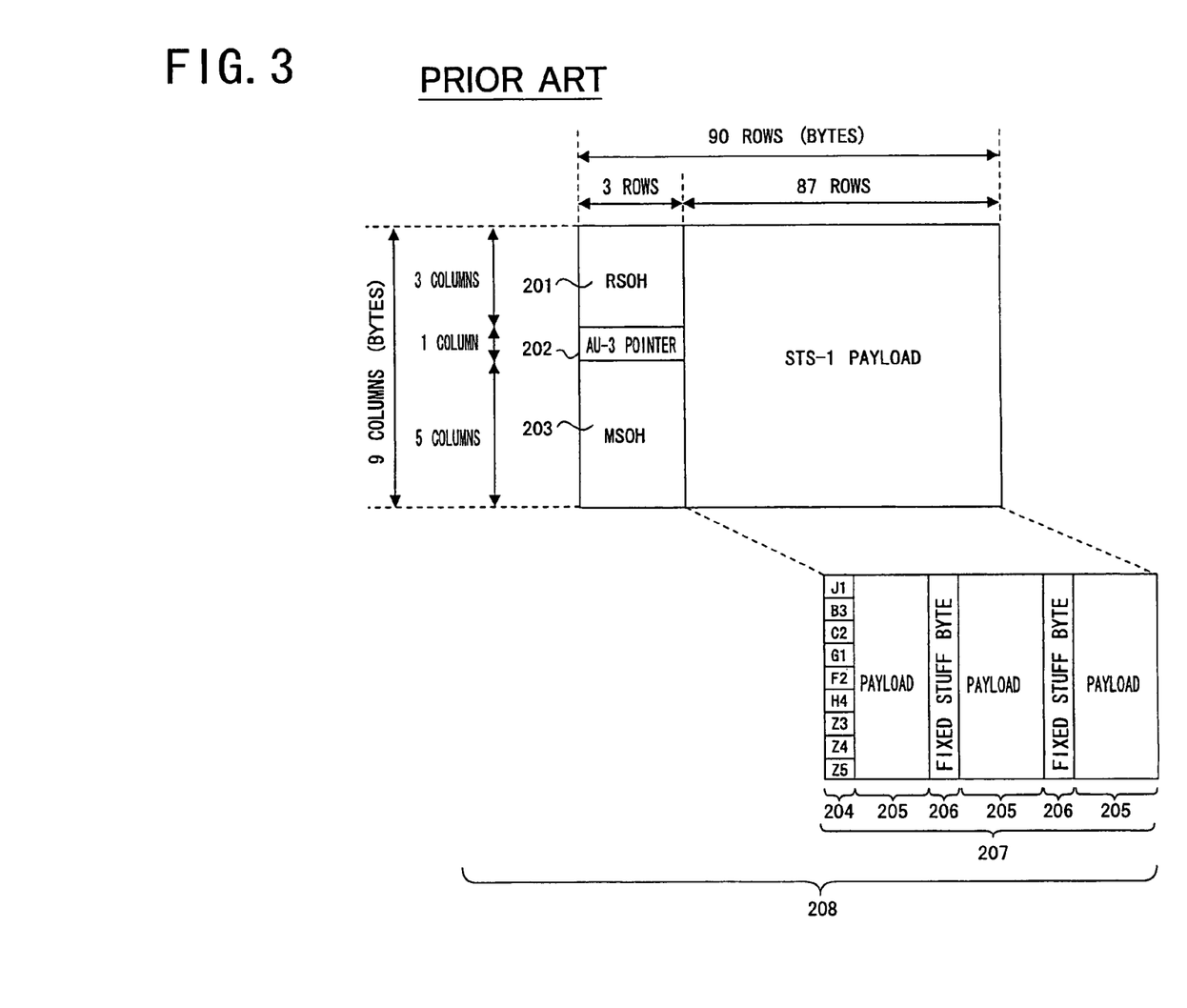
FIG. 3 is a diagrammatic view showing an example of a conventional STS-1 frame structure.

The structure of an STS-1 frame as an example of STS-N frame is shown in FIG. 3. Referring to FIG. 3, the STS-1 frame 208 shown includes an RSOH (Regenerator Section Over Head) 201 composed of 3 columns×3 rows, an AU-3 pointer 202 composed of one column×3 rows, an MSOH (Multiplex Section Over Head) 203 composed of 5 columns×3 rows, and an STS-1 payload 207 composed of 9 columns×87 rows.

The STS-1 payload 207 is formed from a POH (Path Over Head) 204 composed of 9 columns×1 row, a payload 205 composed of 9 columns×28 rows, and a fixed stuff byte 206 composed of 9 columns×1 row. The POH 204 is formed from J1, B3, C2, G1, F2, H4, Z3, Z4 and Z5. The J1 signifies a position designated by the AU-3 pointer 202.

Figure 4:
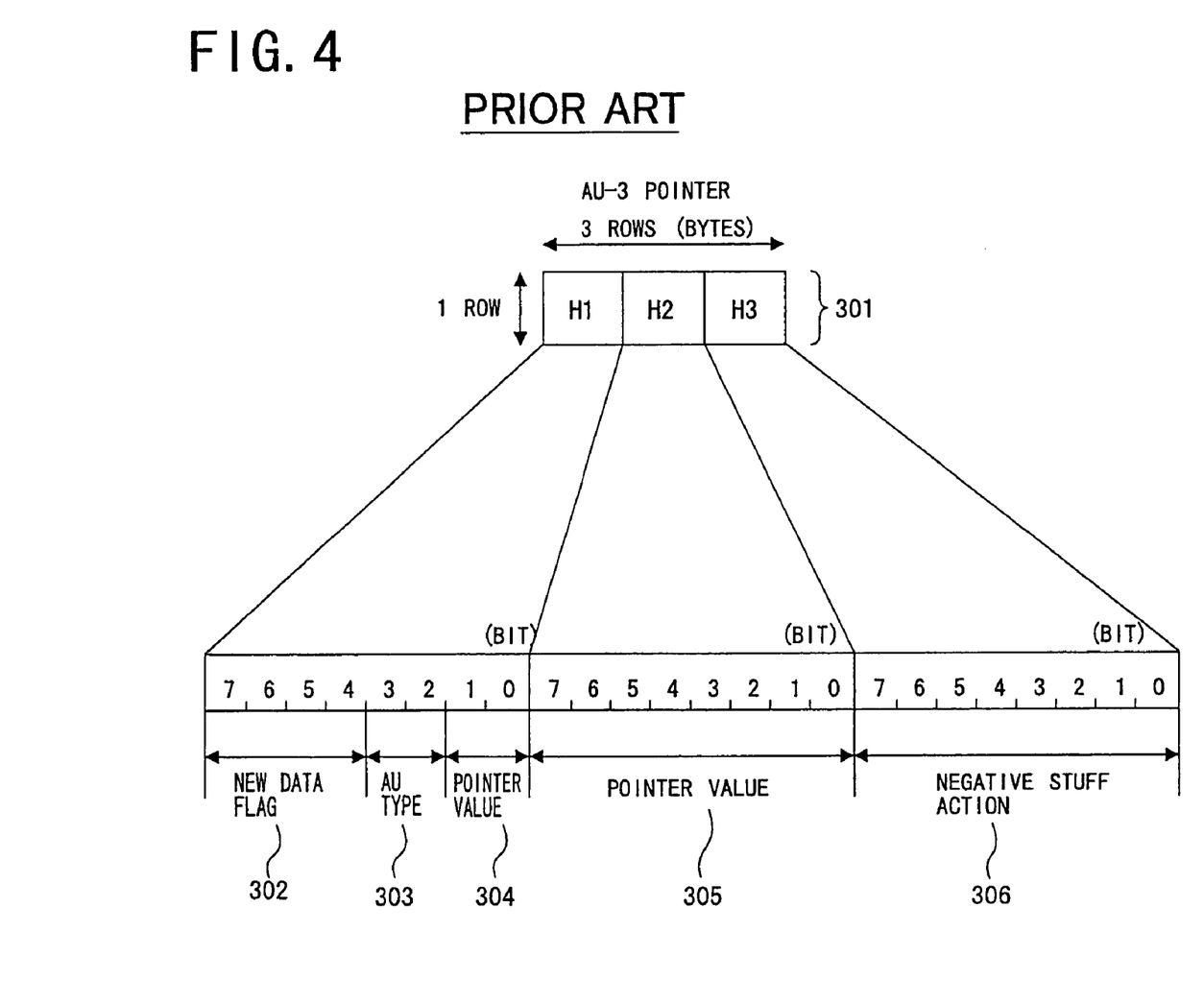
FIG. 4 is a diagrammatic view showing a structure of an AU-3 pointer of the STS-1 frame structure of FIG. 3.

The structure of the AU-3 pointer is shown in FIG. 4. Referring to FIG. 4, the AU-3 pointer 301 is composed of an H1 byte, an H2 byte and an H3 byte. The H1 byte is composed of 8 bits. The bits 7 to 4 form a new data flag 302 indicative of whether or not the AU-3 pointer has been changed, the bits 3 to 2 form an AU type 303 indicative of an AU type, and the bits 1 to 0 form a pointer value 304 indicative of the pointer value.

The H2 byte is composed of 8 bits. The bits 7 to 0 form a pointer value 305 indicative of a pointer value. The H3 byte is composed of 8 bits. The bits 7 to 0 form a negative stuff action 306 for stuffing operation.

Figure 5:
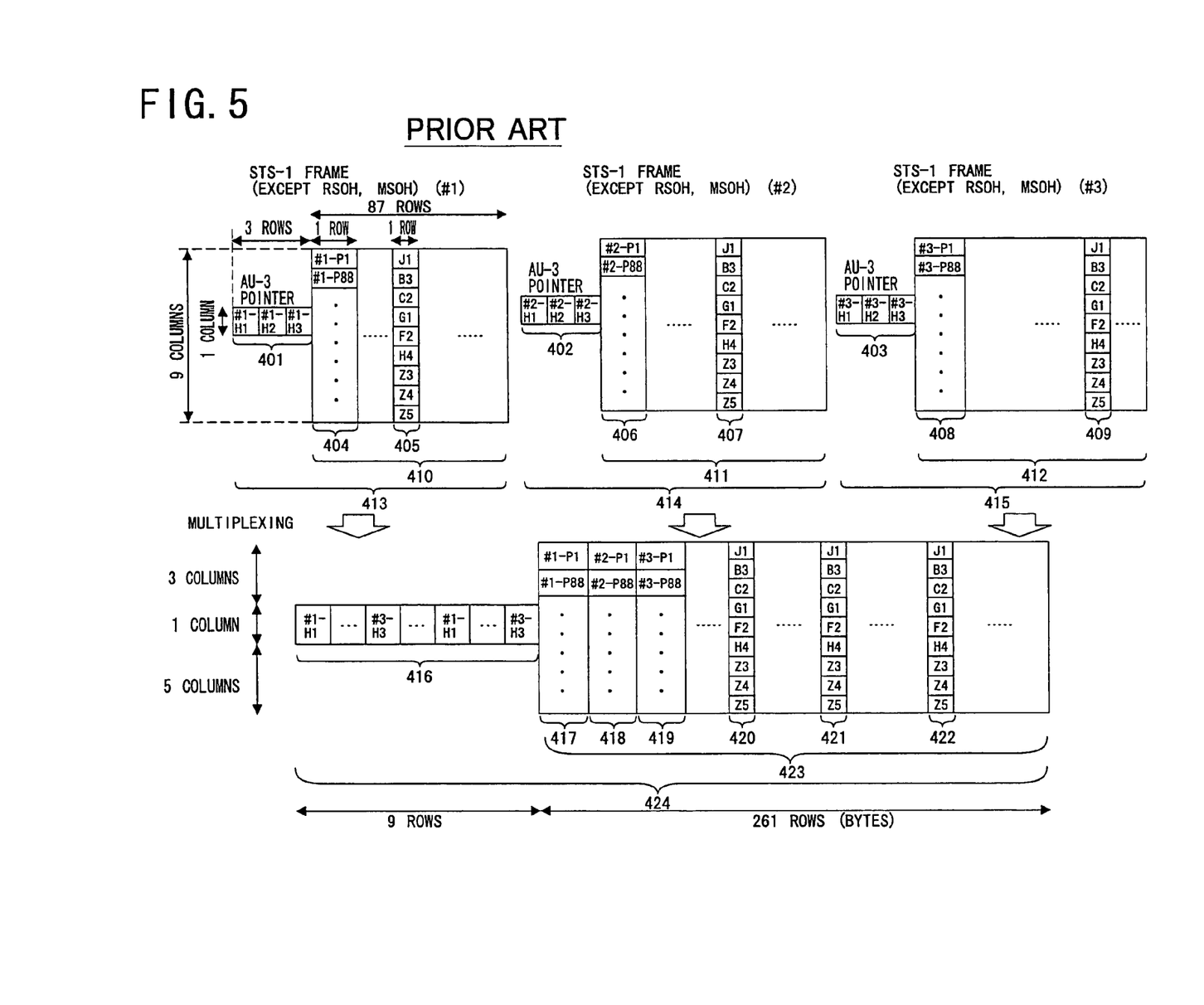
FIG. 5 is a diagrammatic view (except the RSOH and the MSOH) showing a multiplexed structure of an STS-3 frame from three STS-1 frames having the STS-1 frame structure of FIG. 3.

A multiplexed structure of an STS-3 frame formed from three STS-1 frames is shown in FIG. 5. It is to be noted that the RSOH and the MSOH are omitted in FIG. 5. In the following description, the RSOH and the MSOH are removed from an STS-1 frame and an STS-3 frame.

Particularly, FIG. 5 illustrates that different channel data of an STS-1 frame (#1) 413, another STS-1 frame (#2) 414 and a further STS-1 frame (#3) 415 are multiplexed into an STS-3 frame 424.

The STS-1 frame 413 is formed from an AU-3 pointer 401 and an STS-1 payload 410. The STS-1 frame 414 is formed from an AU-3 pointer 402 and an STS-1 payload 411. The STS-1 frame 415 if formed from an AU-3 pointer 403 and an STS-1 payload 412. The STS-3 frame 424 is formed from an AU-pointer 416 composed of one column×9 rows, and a payload 423 composed of 9 columns×261 rows.

In the multiplexing, first the AU-3 pointer 401, AU-3 pointer 402 and AU-3 pointer 403 are multiplexed in order of #1-H1, #2-H1, #3-H1, #1-H2, #2-H2, #3-H2, #1-H3, #2-H3, #3-H3 into the AU-pointer 416.

Then, a POH 405 formed from 9 columns×1 row in the STS-1 payload 410 is multiplexed into a POH 420 composed of 9 columns×1 row in the payload 423; a POH 407 formed from 9 columns×1 row in the STS-1 payload 411 is multiplexed into a POH 421 composed of 9 columns×1 row in the payload 423; a POH 409 composed of 9 columns×1 row in the STS-1 payload 412 is multiplexed into a POH 422 composed of 9 columns×1 row in the payload 423; a POH 404 composed of 9 columns×1 row in the payload 410 is multiplexed into a POH 417 composed of 9 columns×1 row in the payload 423; a POH 406 composed of 9 columns×1 row in the STS-1 payload 411 is multiplexed into a POH 418 composed of 9 columns×1 row in the payload 423; and a POH 408 composed of 9 columns×1 row in the STS-1 payload 412 is multiplexed into a POH 419 composed of 9 columns×1 row in the payload 423.

Figure 6:
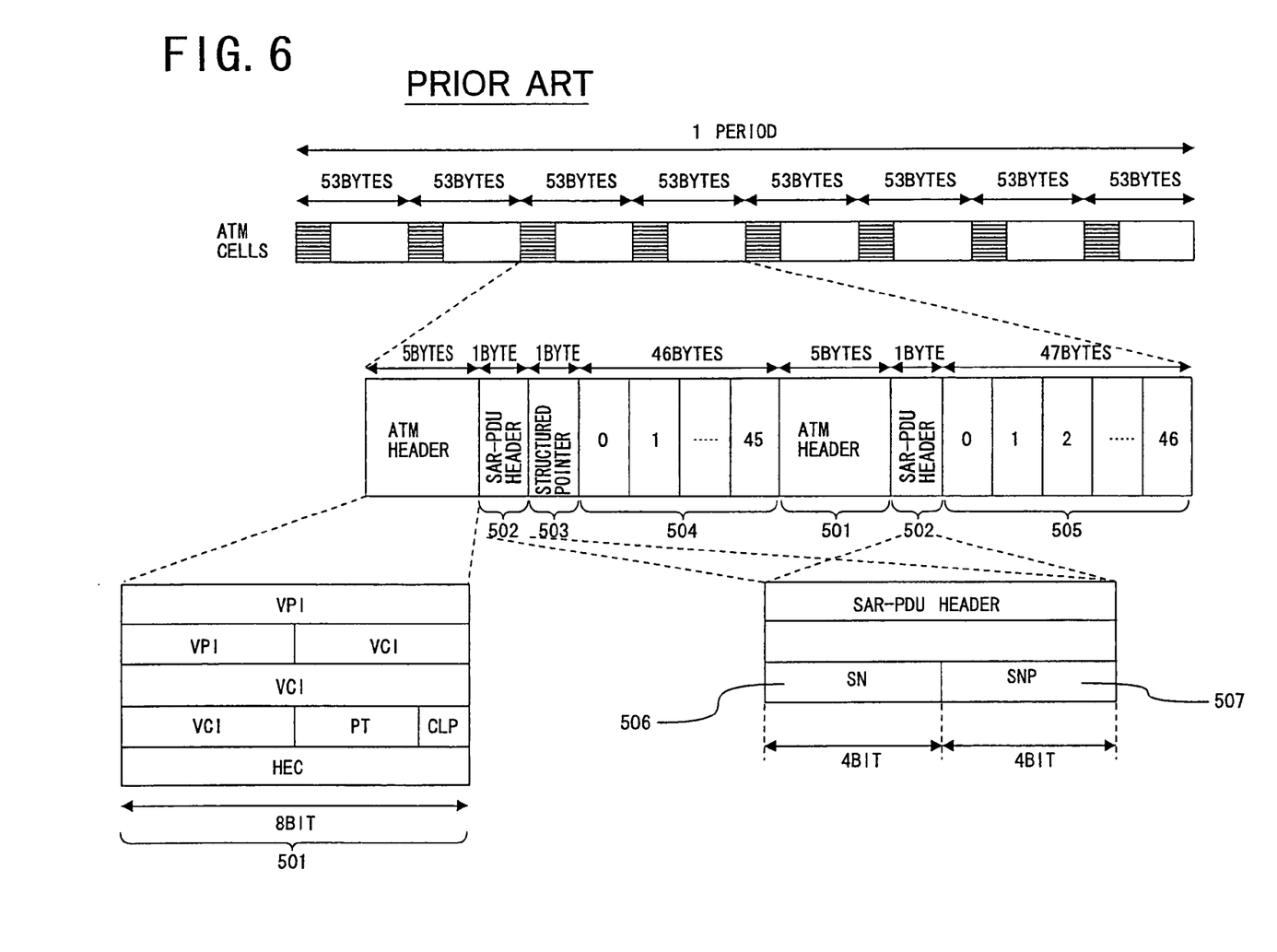
FIG. 6 is a diagrammatic view showing an ATM cell structure for one period upon structured data transfer (SDT) where the STS-1 frame structure of FIG. 3 is employed.

The structure of ATM cells for one period upon structured data transfer is shown in FIG. 6. FIG. 6 shows the structure of an ATM cell where it includes an ATM header 501 composed of 5 bytes, an SAR-PDU (Segmentation And Reassembly-Protocol Data Unit) header 502 composed of 1 byte, a structured pointer 503 composed of 1 byte, and a payload 504 formed from 46 bytes.

FIG. 6 illustrates that eight ATM cells each formed from an ATM header 501 composed of 5 bytes, an SAR-PDU header 502 composed of 1 byte and a payload 505 composed of 47 bytes are transferred as ATM cells for one period by structured data transfer.

The ATM header 501 are composed of totaling 5 bytes including a VPI (Virtual Path Identifier) composed of 12 bits, a VCI (Virtual Channel Identifier) composed of 16 bits, a PT (Payload Type) composed of 3 bits, a CLP (Cell Loss Priority) composed of 1 bit and an HEC (Header Error Control) composed of 8 bits.

The SAR-PDU header 502 is formed from an SN (Sequence Number) 506 composed of 4 bits, and an SNP (Sequence Number Protection) 507 composed of 4 bits. The SN values in the SAR-PDUs of the 53 bytes×8 ATM cells are allocated in order of 0, 1, 2, 3, 4, 5, 6, 7.

The structured pointer 503 is included in an ATM cell whose SN value represents one of 0, 2, 4 and 6 (even-numbered bytes) and indicates the top of the STS-N frame. It is to be noted that the structured pointer 503 is allocated only to one place in the eight ATM cells in the 53 bytes×8 ATM cells.

From the foregoing, the circuit emulation apparatus cellularizes, for example, an STS-3 frame formed by multiplexing three STS-1 frames formed from different channels in accordance with the cell format of FIG. 6 as illustrated in FIG. 5 or multiplexes three different STS-1 frames assembled from ATM cells shown in FIG. 5 into an STS-3 frame.

It is to be noted that the circuit emulation apparatus can similarly cellularize an STS-(N×M) frame (except the RSOH and the MSOH: in the following expression, the RSOH and the MSOH are excepted from an STS-(N×M) frame) formed by multiplexing M (M is an any integer) STS-N (N is any integer) frames (except the RSOH and the MSOH: in the following expression, the RSOH and the MSOH are excepted from an STS-N frame) formed from different channels into ATM cells in accordance with the cell format of FIG. 6 or an multiplex M different STS-N frames assembled from ATM cells into an STS-(N×M) frame.

Now, a multiplexing method by the circuit emulation described above is described.

Figure 7:
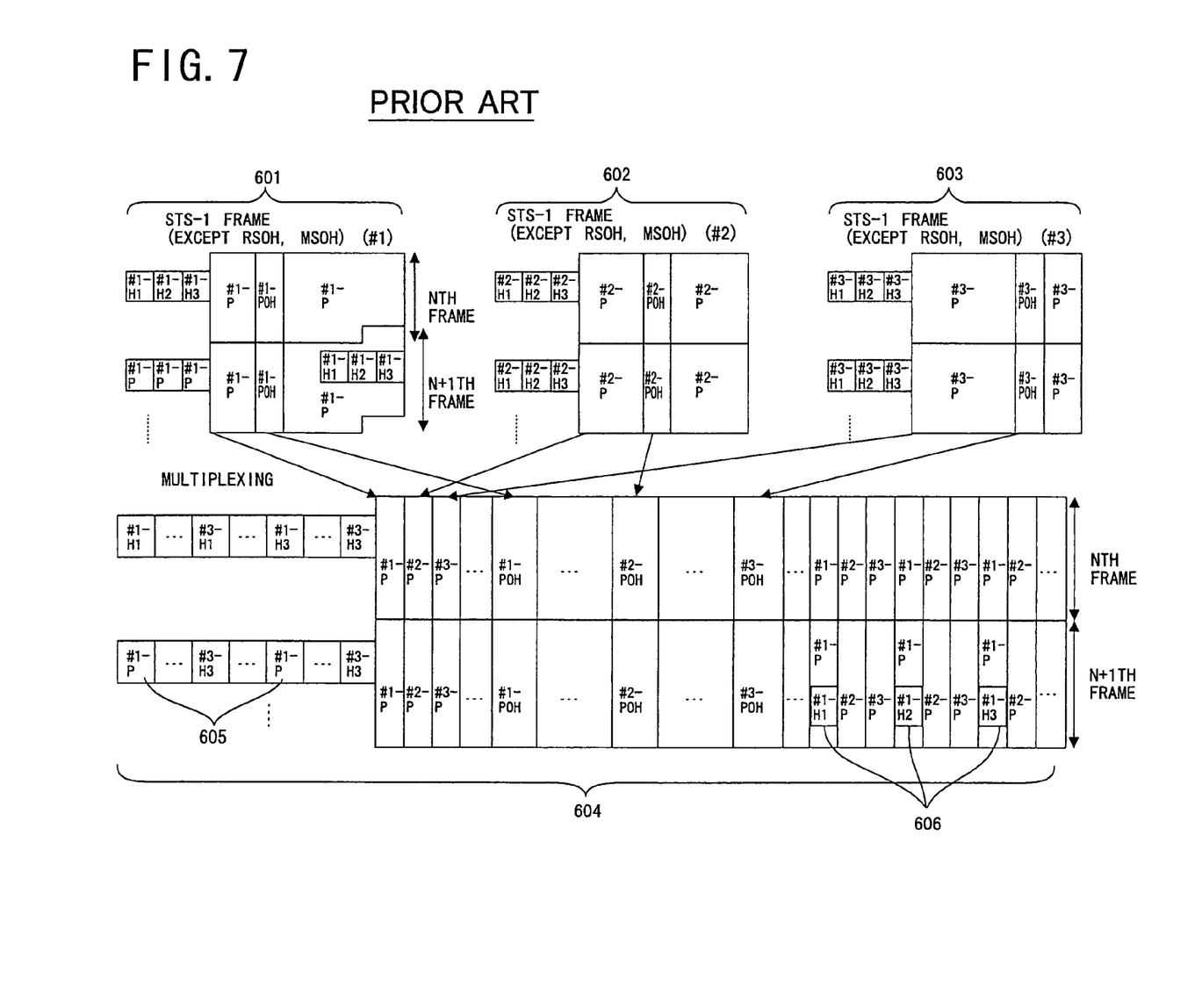
FIG. 7 is a diagrammatic view (except the RSOH and the MSOH) showing a multiplexed structure of an STS-3 frame from three STS-1 frames having the STS-1 frame structure of FIG. 3 when a frame of an abnormal length appears.

FIG. 7 illustrates a multiplexed structure (when a frame of an abnormal length is generated) of an STS-3 frame from three STS-1 frames. Particularly, FIG. 7 illustrates multiplexing of different channel data of an STS-1 frame (#1) 601, another STS-1 frame (#2) 602 and a further STS-1 frame (#3) 603 into an STS-3 frame 604.

For example, referring to FIG. 7, when the circuit emulation apparatus multiplexes three STS-1 frames into an STS-3 frame, if the frame length of the Nth frame of the STS-1 frame (#1) 601 is abnormal and the circuit emulation apparatus detects the abnormal length frame, then the payload in the N+1th frame of the STS-1 frame (#1) 601 is allocated to an AU-pointer 605. In this instance, the AU-pointer value which originally is in the AU-pointer 605 is allocated to a payload 606 in the N+1th frame.

To eliminate this, a method is available wherein, when an abnormal length frame is detected by a segmentation section in a circuit emulation apparatus, the frame of the abnormal length is converted as it is into an ATM cell and a reassembly section in the circuit emulation apparatus inserts dummy data using a buffer to compensate for the frame length.

However, mere insertion of dummy data gives rise to the following problem.

In particular, it is assumed here that, when an STS-3 frame formed by multiplexing three STS-1 frames formed from different channels is cellularized into ATM cells or three different STS-1 frames assembled from ATM cells are multiplexed into an STS-3 frame, a frame of an abnormal length is inputted to a segmentation section in a circuit emulation apparatus.

In this instance, if the abnormal length frame is cellularized as it is into ATM cells and the ATM cells are inputted from an ATM switch to a reassembly buffer, then since no drop or loss of data of the frame occurs between the segmentation section to the reassembly section although the frame length is abnormal, if the reassembly section inserts dummy data in order to compensate for the frame length, then the amount of data stored into the reassembly buffer increases.

Therefore, if a frame of a similar abnormal length appears by a plurality of numbers of times, then the stored amount in the reassembly buffer increases by an amount equal to the dummy data inserted, and finally, the reassembly buffer will suffer from an overflow.

A similar problem occurs also where an STS-(N×M) frame formed by multiplexing M STS-N frames formed from different channels is cellularized into ATM cells or M different STS-N frames assembled from ATM cells are multiplexed into an STS-(N×M) frame.

SUMMARY OF THE INVENTION

It is an object of the present invention to provide a circuit emulation apparatus and a frame length compensation method by which, when an STS-(N×M) frame formed by multiplexing M STS-N frames formed from different channels is cellularized into ATM cells or M different STS-N frames assembled from ATM cells are multiplexed into an STS-(N×M) frame, even if an STS-N frame of an abnormal length is detected, the frame length can be compensated for while preventing an overflow of a reassembly buffer in the circuit emulation apparatus.

In order to attain the object described above, according to an aspect of the present invention, there is provided an STS frame-ATM cell circuit emulation apparatus for cellularizing an STS-(N×M) formed by multiplexing M STS-N frames formed from different channels into ATM cells and multiplexing M different STS-N frames assembled from ATM cells into an STS-(N×M) frame, comprising circuit termination means for inputting and outputting frame data from and to a circuit, buffer means for inputting and outputting an ATM cell sync signal and ATM cell data from and to an ATM switch, and segmentation means and reassembly means connected between the circuit termination means and the buffer means, the circuit termination means outputting frame data from the circuit as a frame pulse signal and frame data to the segmentation means, the segmentation means outputting the frame pulse signal and the frame data from the circuit termination means as an ATM cell sync signal and ATM cell data to the buffer means, the buffer means temporarily storing and then outputting the ATM cell sync signal and the ATM cell data from the segmentation means to the ATM switch, the buffer means temporarily storing and then outputting the ATM cell sync signal and the ATM cell data from the ATM switch to the reassembly means, the reassembly means detecting a frame of an abnormal length from the ATM cell sync signal and the ATM cell data from the buffer means, compensating, when a frame of an abnormal length is detected, for the frame length of the frame with a next frame and outputting a resulting frame as a frame pulse signal and frame data to the circuit termination means.

The reassembly means may include a VPI/VCI supervision section for supervising a VPI/VCI in an ATM cell header of the ATM cell sync signal and the ATM cell data, a structured pointer supervision section for supervising structured pointer information indicating the top of an STS frame to detect an abnormal length of the frame, a decellularization section for extracting an AU-pointer value and payload data values from an ATM payload in an ATM cell and decellularizing the AU-pointer value and the payload data values for each frame, and an AU-pointer rewriting section for compensating, when the structured pointer supervision section detects an abnormal length of the frame, for the abnormal length of the frame with the payload of the next frame and rewriting the AU-pointer value.

The STS frame-ATM cell circuit emulation apparatus may be constructed such that the VPI/VCI supervision section receives the ATM cell sync signal and the ATM cell data inputted thereto from the ATM switch, identifying data for the individual channels and outputting structured pointer values distributed for the individual channels to the structured pointer supervision section, and the structured pointer supervision section detects the structured pointer values of the individual channels, outputs the structured pointer values as structured pointer information to the AU-pointer rewriting section, checks the frame length based on the structured pointer values and transmits, when a frame of an abnormal length is detected, an abnormal length frame signal to the AU-pointer rewriting section, whereafter the AU-pointer rewriting section detects a data byte number corresponding to the abnormal length of the frame based on the abnormal length frame signal and compensating for the frame length with the payload of the next frame.

When the AU-pointer rewriting section compensates for the frame length with the payload data of the next frame, the AU-pointer rewriting section may rewrite the AU-pointer value for the frames next to the frame with which the abnormal length is detected.

The frame of the abnormal length may be a short frame or a long frame.

According to another aspect of the present invention, there is provided a frame length compensation method for an STS frame-ATM cell circuit emulation apparatus for cellularizing an STS-(N×M) formed by multiplexing M STS-N frames formed from different channels into ATM cells and multiplexing M different STS-N frames assembled from ATM cells into an STS-(N×M) frame, comprising the steps of outputting frame data from a circuit received by circuit termination means as a frame pulse signal and frame data to segmentation means, outputting the frame pulse signal and the frame data from the circuit termination means as an ATM cell sync signal and ATM cell data to buffer means, temporarily storing into the buffer means and then outputting the ATM cell sync signal and the ATM cell data from the segmentation means to an ATM switch, temporarily storing into the buffer means and then outputting an ATM cell sync signal and ATM cell data from the ATM switch to the reassembly means, and detecting a frame of an abnormal length from the ATM cell sync signal and the ATM cell data, compensating, when a frame of an abnormal length is detected, for the frame length of the frame with a next frame by the reassembly means and outputting a resulting frame as a frame pulse signal and frame data from the reassembly means to the circuit termination means.

The reassembly means may supervise a VPI/VCI in an ATM cell header of the ATM cell sync signal and the ATM cell data, supervise structured pointer information indicating the top of an STS frame to detect an abnormal length of the frame, extract an AU-pointer value and payload data values from an ATM payload in an ATM cell and decellularizes the AU-pointer value and the payload data values for each frame, and compensate, when an abnormal length of the frame is detected, for the abnormal length of the frame with the payload of the next frame and rewrites the AU-pointer value.

The frame length compensation method may be constructed such that the ATM cell sync signal and the ATM cell data inputted from the ATM switch are received and data for the individual channels are identified and then structured pointer values distributed for the individual channels are outputted, and the structured pointer values of the individual channels are detected and the frame length is checked based on the structured pointer values and then, when a frame of an abnormal length is detected, an abnormal length frame signal is generated, whereafter a data byte number corresponding to the abnormal length of the frame is detected based on the abnormal length frame signal and the frame length is compensated for with the payload of the next frame.

When the frame length is compensated for with the payload data of the next frame, the AU-pointer value for the frames next to the frame with which the abnormal length is detected may be rewritten.

With the circuit simulation apparatus and the frame length compensation method, a frame of an abnormal length is detected from an ATM cell sync signal and ATM cell data from the buffer means, and when the frame has an abnormal length, its frame length is compensated for with a next frame. Consequently, even if the reassembly buffer in the circuit simulation apparatus detects a frame of an abnormal length, the frame length can be compensated for while preventing the reassembly buffer from suffering from an overflow.

The above and other objects, features and advantages of the present invention will become apparent from the following description and the appended claims, taken in conjunction with the accompanying drawings in which like parts or elements are denoted by like reference symbols.

DESCRIPTION OF THE PREFERRED EMBODIMENT

Figure 1:
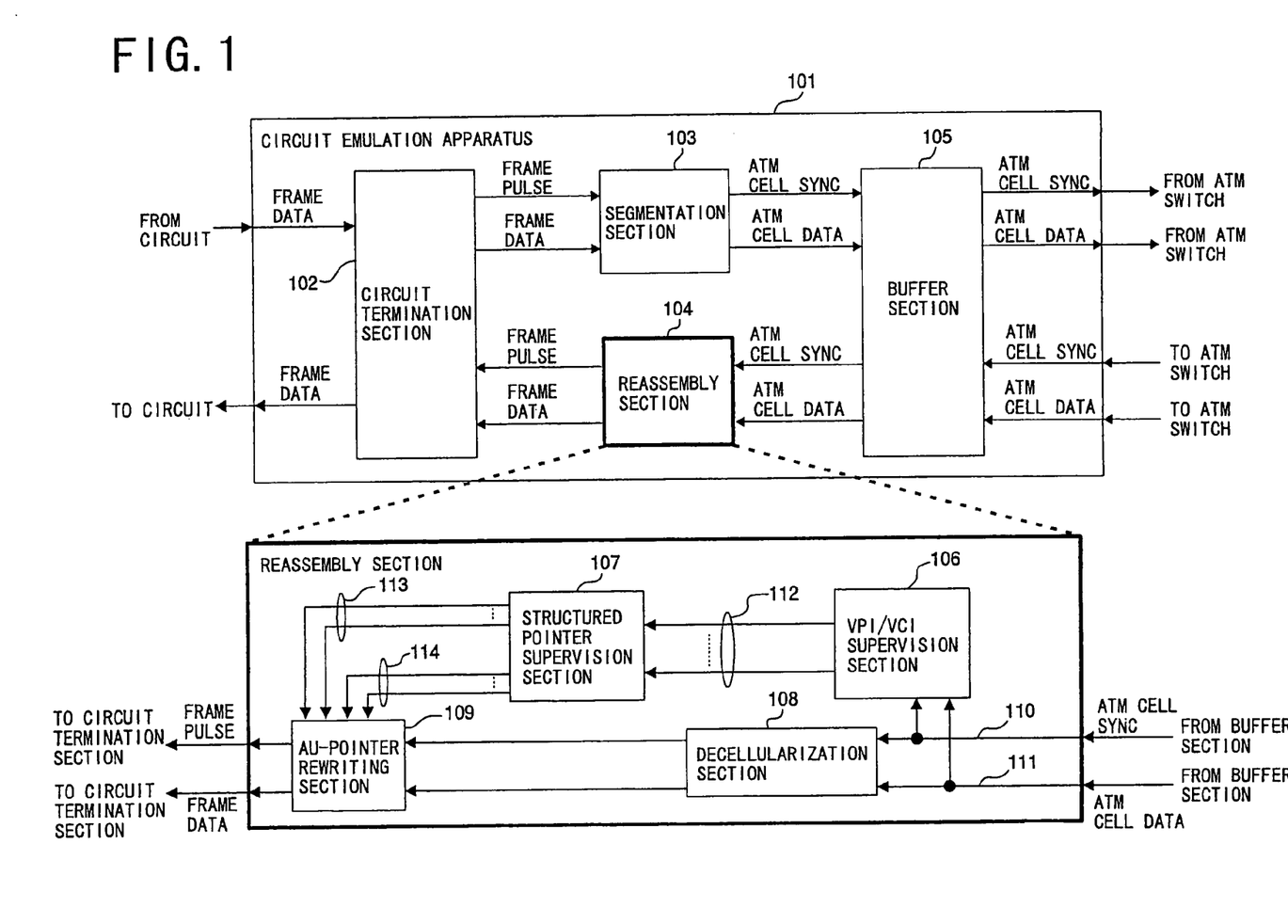
FIG. 1 is a block diagram showing a circuit emulation apparatus to which the present invention is applied.

Referring to FIG. 1, there is shown a circuit emulation apparatus to which the present invention is applied. The circuit emulation apparatus shown is generally denoted at 101 and includes a circuit termination section 102, a segmentation section 103, a reassembly section 104, and a buffer section 105.

The circuit termination section 102 outputs frame data from an external circuit as a frame pulse signal and frame data. Further, the circuit termination section 102 outputs frame data to the external circuit.

The segmentation section 103 outputs a frame pulse signal and frame data from the circuit termination section 102 as an ATM cell sync signal and ATM cell data. The buffer section 105 temporarily stores the ATM cell sync signal and the ATM cell data from the segmentation section 103 and the outputs them to an external ATM switch. Further, the buffer section 105 temporarily stores an ATM cell sync signal and ATM cell data from the ATM switch and then outputs them.

The reassembly section 104 outputs an ATM cell sync signal and ATM cell data from the buffer section 105 as a frame pulse signal and frame data to the circuit termination section 102. The reassembly section 104 includes a VPI/VCI supervision section 106, a structured pointer supervision section 107, a decellularization section 108, and an AU-pointer rewriting section 109.

The VPI/VCI supervision section 106 supervises the VPI/VCI in the ATM cell header. The structured pointer supervision section 107 extracts structured pointer information explicitly indicating the top of an STS frame and supervises the period of the structured pointer information.

The decellularization section 108 extracts an AU-pointer value and payload data values from the ATM payload in an ATM cell and manages (decellularizes) them separately for each frame. The AU-pointer rewriting section 109 rewrites the AU-pointer value if a variation of the detected period of the structured point value is detected.

Now, operation of the circuit emulation apparatus 101 having such a configuration as described above is described.

First, the VPI/VCI supervision section 106 of the reassembly section 104 shown in FIG. 1 receives an ATM cell sync signal 110 and ATM cell data 111 inputted thereto from the ATM switch and identifies data for each channel. After the channels are identified by the VPI/VCI supervision section 106, the data are distributed for the individual channels and the data 112 of the individual channels are transmitted to the structured pointer supervision section 107. The structured pointer supervision section 107 detects structured pointer values for the individual channels and transmits structured pointer information 114 to the AU-pointer rewriting section 109.

Thereupon, the structured pointer supervision section 107 checks the frame length based on the structured pointer value. If a frame of an abnormal length is detected, then the structured pointer supervision section 107 transmits a abnormal length frame signal 113 which indicates, for example, if the frame of an abnormal length is a short frame, by what quantity the frame data is short to the AU-pointer rewriting section 109.

The AU-pointer rewriting section 109 detects the data byte number by which the short frame is short and compensates for the frame length with payload data of a next frame. Further, the AU-pointer rewriting section 109 rewrites the AU-pointer value for succeeding frames to the frame detected as the short frame.

Here, detailed operation of the AU-pointer rewriting section 109 is described. It is to be noted that the following description relates to the operation when a short frame appears as described hereinabove with reference to FIG. 7.

Figure 2:
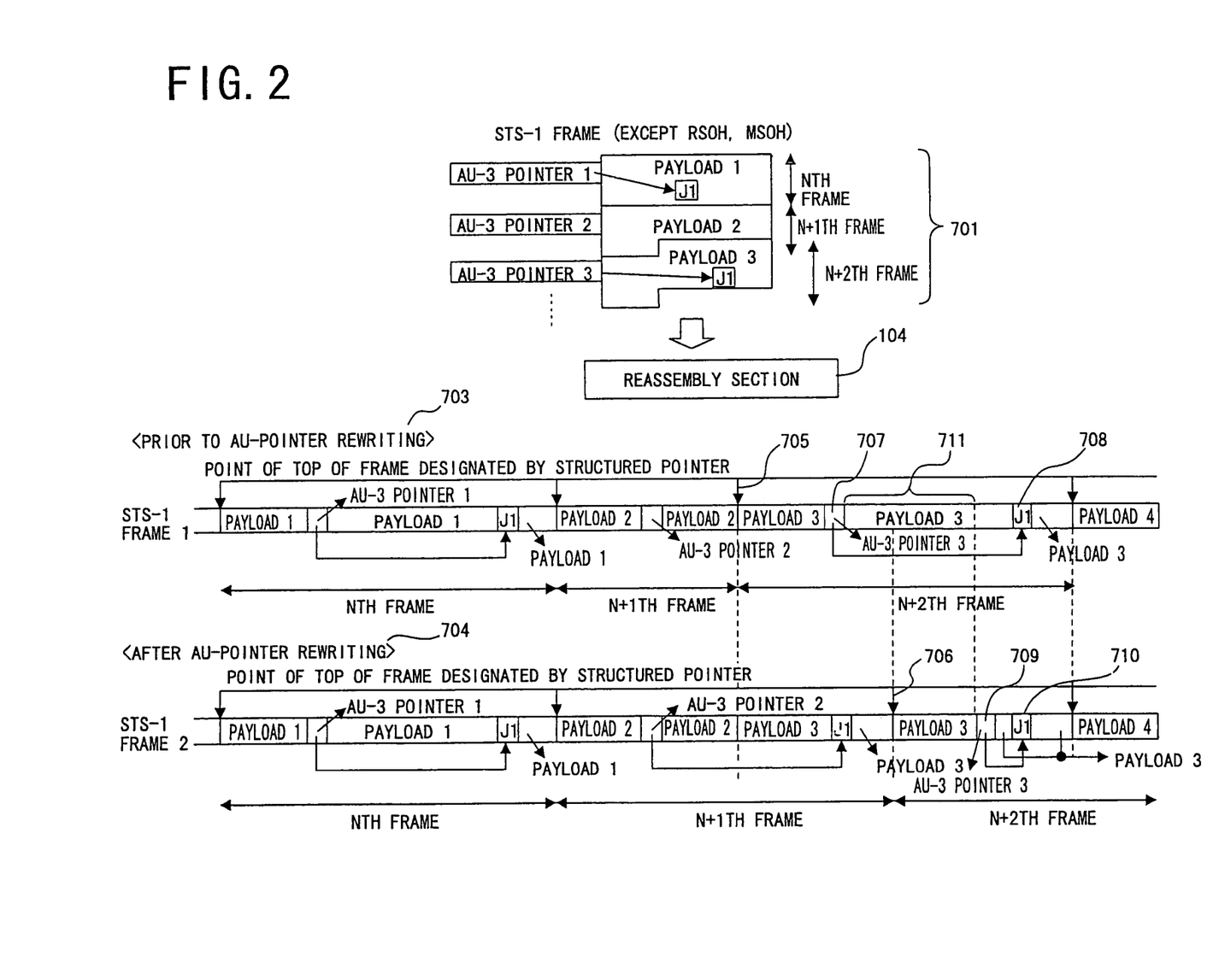
FIG. 2 is a diagrammatic view illustrating a multiplexing and frame length compensation method of the circuit emulation apparatus of FIG. 1.

As seen in FIG. 2, the circuit emulation apparatus 101 of FIG. 1 receives ATM cells corresponding to an STS-1 frame 701 wherein frames in the form of the STS-1 frame 701 appear successively and the N+1th frame is a short frame. In this instance, when the reassembly section 104 reassembles ATM cells corresponding to the STS-1 frame 701 wherein the N+1th frame is a short frame, since the N+1th frame at a point of time 703 prior to AU-pointer rewriting is a short frame, the AU-pointer rewriting section 109 receives an amount of the abnormal length frame signal 113 and the structured pointer information 114 transmitted from the structured pointer supervision section 107 of FIG. 1 which is equal to the quantity of data by which the N+1th frame is short. Then, the frame length is compensated for with payload data of the N+2th frame for the short data. Also the frames beginning with the N+2th frame are processed similarly.

However, since the frame length corresponding to the data short in the N+1th frame at the time 703 prior to AU-pointer rewriting is compensated for with payload data of the N+2th frame, the AU-3 pointer value of the AU-3 pointer 3-707 is moved to the AU-3 pointer 3-709 in the N+2th frame at a time 704 after AU-pointer rewriting (also the payload 3-711 is slid forwardly by an amount equal to the number of bytes by which the AU-3 pointer 3-707 is moved) so that the position of the J1 byte 708 indicated by the AU-3 pointer 3-707 in the N+2th frame at the time 703 prior to AU-pointer rewriting. Further, the AU-pointer value of the AU-pointer 3-709 is rewritten so that the AU-3 pointer 3-709 may designate the J1 byte 710.

In this instance, the decellularization section 108 of FIG. 1 receives the ATM cell sync signal 110 and the ATM cell data 111 from the ATM switch, extracts the payload of the ATM cell data 111 other than the ATM header, SAR-PDU header and structured pointer and performs decellularization of the payload as described hereinabove with reference to FIG. 6.

It is to be noted that, if the frames beginning with the N+2th frame in the form of the STS-1 frame 701 of FIG. 2 are normal, if the AU-pointer is not rewritten, then the position of the J1 byte indicated by the AU-pointer is displaced. Therefore, the byte number of data by which they are short when a short frame appears at the N+1th frame in the form of the STS-1 frame 701 is stored. Further, based on the byte number of the short data, frame compensation and rewriting of the AU-pointer value in the frames beginning with the N+2th frame in the form of the STS-1 frame 701 is performed.

Also when one of the frames beginning with the N+2th frame in the form of the STS-1 frame 701 of FIG. 2 is abnormal (for example, a short frame), if the AU-pointer is not rewritten, then the position of the J1 byte indicated by the AU-pointer is displaced. Therefore, the byte number of short data when the short frame appears at the N+1th frame in the form of the STS-1 frame 701 is stored. Then, the byte number is compared with the byte number of short data when the short frame appears at the N+2th frame in the form of the STS-1 frame 701, and a result of the comparison is used for frame compensation and rewriting of the AU-pointer value in the frames beginning with the N+2th frame in the form of the STS-1 frame 701.

In this manner, in the present embodiment, when an STS-(N×M) frame formed by multiplexing M STS-N frames formed from different channels is cellularized into ATM cells or M different STS-N frames assembled from ATM cells are multiplexed into an STS-(N×M) frame, an ATM cell sync signal and ATM cell data from the buffer section 105 are outputted as a frame pulse signal and frame data to the circuit termination section 102 and frame length compensation for the frame pulse signal and the frame data is performed by the reassembly section 104. Consequently, even if an abnormal length frame of an STS-N frame is detected by the reassembly buffer in the circuit emulation apparatus 101, the frame length can be compensated for while preventing the reassembly buffer from suffering from an overflow.

This is because, when M STS-N frames assembled from ATM cells are multiplexed into an STS-(N×M) frame by the circuit emulation apparatus 101, even if the frame length of any STS-N frame is abnormal, compensation for the frame length and rewriting of the AU-pointer value are performed based on payload data of a succeeding frame or frames.

It is to be noted that, while the foregoing description relates to operation where an STS-1 frame is a short frame, similar operation can be performed also where an STS-1 frame is a long frame. Similar operation can be performed also when a short frame or a long frame is detected where it is an STS-N frame.

While a preferred embodiment of the present invention has been described using specific terms, such description is for illustrative purpose only, and it is to be understood that changes and variations may be made without departing from the spirit or scope of the following claims.

What is claimed is:

1. A method for adjusting STS frame lengths, comprising:
   receiving, by an ATM cell to STS frame decellularization apparatus, ATM cells from an ATM switch;
   generating, by the ATM cell to STS frame decellularization apparatus, a number of STS frames from the ATM cells, each STS frame including at least payload data;
   determining, by the ATM cell to STS frame decellularization apparatus, whether a first STS frame in the number of STS frames includes an abnormal length; and
   adjusting, by the ATM cell to STS frame decellularization apparatus, the length of the first STS frame based on payload data for a next STS frame when it is determined that the first STS frame includes an abnormal length.

2. The method of claim 1, wherein the determining whether a first STS frame in the number of STS frames includes an abnormal length further comprises:
   identifying a structured pointer value for each of the number of STS frames; and
   checking a frame length for each of the number of STS frames based on the structured pointer value.

3. The method of claim 2, further comprising:
generating an abnormal length frame signal having a data byte number representative of a quantity by which the first STS frame is abnormal when it is determined that the first STS frame includes an abnormal length; and
adjusting the length of the first STS frame based on payload data for the next STS frame and the abnormal length frame signal.

4. The method of claim 3, wherein adjusting the length of the first STS frame based on payload data for the next STS frame and the abnormal length frame signal, further comprises:
identifying a position of an AU-pointer value associated with the next STS frame; and
rewriting the AU-pointer value in a second position based on the abnormal length frame signal.

5. The method of claim 1, wherein the abnormal length includes a length less than a predetermined threshold.

6. The method of claim 1, wherein the abnormal length includes a length greater than a predetermined threshold.

7. The method of claim 1, wherein the abnormal length includes lengths greater than or equal to 90 bytes.

8. An ATM cell to STS frame decellularization apparatus, comprising:
buffer means for receiving ATM cells from an ATM switch; and
reassembly means connected to the buffer means and configured to:
decellularize the ATM cells received from the buffer means into one or more STS frames,
detect STS frames of an abnormal length,
compensate for the abnormal length of a frame with data from a next STS frame to form a resulting frame, when a frame of an abnormal length is detected, and
output the resulting frame.

9. The ATM cell to STS frame decellularization apparatus of claim 8, wherein the reassembly means further comprises:
supervising means connected to the buffer means and configured to extract STS frame length information from the received ATM cells and detect STS frames having abnormal lengths.

10. The ATM cell to STS frame decellularization apparatus of claim 8, further comprising:
decellularization means for extracting an administrative unit (AU)-pointer value and payload data values from the ATM cells and generating STS frames based on the extracted AU-pointer values and payload data values; and
AU-pointer rewriting means for rewriting the AU-pointer value when STS frames of abnormal length are detected.

11. The ATM cell to STS frame decellularization apparatus of claim 10, wherein the AU-pointer rewriting means is configured to rewrite the AU-pointer values for each frame following a frame having a detected abnormal length to reflect the frame length compensation.

12. The ATM cell to STS frame decellularization apparatus of claim 10, wherein the AU-pointer rewriting means is further configured to:
identify a location of new AU-pointer values in each frame following a frame having a detected abnormal length;
shift frame payloads forward to accommodate the new AU-pointer value locations; and
rewrite the AU-pointer values at the identified locations for each frame following the frame having a detected abnormal length.

13. The ATM cell to STS frame decellularization apparatus of claim 10, wherein the AU-pointer values identify J1 path overhead bytes associated with respective STS frames.

* * * * *